United States Patent
Boscher et al.

(10) Patent No.: US 10,630,482 B2
(45) Date of Patent: *Apr. 21, 2020

(54) SYSTEMS AND METHODS FOR DOWNLOADING CODE AND DATA INTO A SECURE NON-VOLATILE MEMORY

(71) Applicant: Cypress Semiconductor Corporation, San Jose, CA (US)

(72) Inventors: Arnaud Boscher, Puteaux (FR); Nicolas Prawitz, Yvette (FR)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,092

(22) Filed: Apr. 13, 2017

(65) Prior Publication Data

US 2017/0287366 A1 Oct. 5, 2017

Related U.S. Application Data

(63) Continuation of application No. 12/253,207, filed on Oct. 16, 2008, now Pat. No. 9,653,004.

(51) Int. Cl.
| | |
|---|---|
| *G06F 21/62* | (2013.01) |
| *H04L 9/32* | (2006.01) |
| *H04L 9/08* | (2006.01) |
| *G06F 12/14* | (2006.01) |

(52) U.S. Cl.
CPC ........ *H04L 9/3247* (2013.01); *G06F 21/6218* (2013.01); *H04L 9/0869* (2013.01); *G06F 12/1408* (2013.01); *H04L 2209/12* (2013.01)

(58) Field of Classification Search
CPC . H04L 9/3247; H04L 9/0869; H04L 2209/12; G06F 21/6218; G06F 12/1408
See application file for complete search history.

(56) References Cited

U.S. PATENT DOCUMENTS

| | | | | |
|---|---|---|---|---|
| 4,319,079 A | * | 3/1982 | Best | G06F 12/1408 380/37 |
| 5,113,516 A | * | 5/1992 | Johnson | G06F 7/785 341/60 |
| 5,428,685 A | * | 6/1995 | Kadooka | G06F 21/602 705/51 |
| 5,666,411 A | * | 9/1997 | McCarty | G06F 9/3879 705/51 |
| 6,477,252 B1 | * | 11/2002 | Faber | G06F 21/445 348/E7.056 |

(Continued)

OTHER PUBLICATIONS

USPTO Advisory Action for U.S. Appl. No. 12/253,207 dated Mar. 13, 2012; 3 pages.

(Continued)

*Primary Examiner* — Michael R Vaughan (57) ABSTRACT

An example secure embedded device includes a secure non-volatile memory coupled to a processor. The processor provides a scramble or cipher key and uses a scramble algorithm or a cipher algorithm to scramble or cipher information received from an external device into transformed information. The processor writes a least a portion of the transformed information to a plurality of memory locations of the secure non-volatile memory. The plurality of memory locations is based on the scramble or cipher key.

10 Claims, 5 Drawing Sheets

(56) References Cited

U.S. PATENT DOCUMENTS

| | | | | |
|---|---|---|---|---|
| 6,834,347 B2* | 12/2004 | Goodman | | G06F 21/10 380/30 |
| 6,859,535 B1* | 2/2005 | Tatebayashi | | G06F 21/10 380/201 |
| 7,055,029 B2* | 5/2006 | Collins | | G06F 21/572 380/262 |
| 7,298,845 B2 | 11/2007 | Tatebayashi et al. | | |
| 8,127,104 B1* | 2/2012 | Shen | | G06F 12/02 711/165 |
| 8,478,861 B2* | 7/2013 | Taylor | | G06F 15/173 705/412 |
| 8,612,752 B2* | 12/2013 | Batta | | H04L 45/00 380/239 |
| 8,744,080 B2 | 6/2014 | Yanamoto | | |
| 8,863,309 B2 | 10/2014 | Wang et al. | | |
| 9,653,004 B2 | 5/2017 | Boscher et al. | | |
| 2002/0152393 A1* | 10/2002 | Thoma | | H04L 63/0435 713/189 |
| 2003/0112611 A1* | 6/2003 | Nishizawa | | G06K 19/0719 361/763 |
| 2003/0126451 A1* | 7/2003 | Gorobets | | G06F 12/1408 713/189 |
| 2003/0133574 A1* | 7/2003 | Caronni | | G06F 12/1408 380/277 |
| 2003/0229777 A1* | 12/2003 | Morais | | G06F 21/575 713/2 |
| 2004/0143724 A1* | 7/2004 | Jacob | | G06F 15/7867 712/11 |
| 2005/0071651 A1* | 3/2005 | Aguilar, Jr. | | G06F 21/602 713/189 |
| 2005/0102527 A1* | 5/2005 | Tatebayashi | | G06F 21/10 713/189 |
| 2005/0138270 A1* | 6/2005 | Morais | | G06F 21/575 711/102 |
| 2006/0036897 A1* | 2/2006 | Lin | | G06F 11/1068 714/5.1 |
| 2006/0050871 A1* | 3/2006 | Ranen | | H04L 9/0897 380/37 |
| 2006/0061795 A1* | 3/2006 | Walmsley | | G06F 21/75 358/1.14 |
| 2006/0101284 A1* | 5/2006 | Feuser | | G06F 12/1408 713/189 |
| 2006/0126827 A1* | 6/2006 | Milleville | | H04L 9/0662 380/28 |
| 2006/0129794 A1* | 6/2006 | Rudelic | | G06F 9/44573 713/2 |
| 2006/0129806 A1* | 6/2006 | Walmsley | | B41J 2/17546 713/161 |
| 2006/0132822 A1* | 6/2006 | Walmsley | | G06F 12/1408 358/1.14 |
| 2006/0136657 A1* | 6/2006 | Rudelic | | G06F 3/0607 711/103 |
| 2006/0136725 A1* | 6/2006 | Walmsley | | H04L 9/12 713/171 |
| 2006/0137015 A1* | 6/2006 | Fahrny | | H04N 7/17318 726/26 |
| 2006/0139681 A1* | 6/2006 | Walmsley | | G06F 21/445 358/1.14 |
| 2006/0143454 A1* | 6/2006 | Walmsley | | G06F 21/85 713/170 |
| 2006/0294312 A1* | 12/2006 | Walmsley | | H04L 9/0662 711/122 |
| 2007/0011023 A1* | 1/2007 | Silverbrook | | B41J 2/14427 705/50 |
| 2007/0061581 A1* | 3/2007 | Holtzman | | G06F 12/0246 713/176 |
| 2007/0083491 A1* | 4/2007 | Walmsley | | G06F 21/608 |
| 2007/0116270 A1* | 5/2007 | Fischer | | G06F 7/722 380/30 |
| 2007/0136609 A1* | 6/2007 | Rudelic | | G06F 21/606 713/193 |
| 2007/0150890 A1* | 6/2007 | Shapiro | | G06F 8/61 717/174 |
| 2007/0217604 A1* | 9/2007 | Yanamoto | | G06F 21/10 380/54 |
| 2007/0260866 A1* | 11/2007 | Wang | | G06F 21/57 713/2 |
| 2008/0019503 A1* | 1/2008 | Dupaquis | | H04L 9/0625 380/28 |
| 2008/0028235 A1* | 1/2008 | Smith | | G06F 21/575 713/190 |
| 2008/0086647 A1* | 4/2008 | Rodgers | | G06F 21/572 713/190 |
| 2008/0086657 A1* | 4/2008 | Chen | | G06F 21/572 714/3 |
| 2008/0098212 A1* | 4/2008 | Helms | | H04L 63/0428 713/155 |
| 2008/0155271 A1* | 6/2008 | Barck | | G06F 21/72 713/189 |
| 2008/0219444 A1* | 9/2008 | Benteo | | H04L 9/0869 380/255 |
| 2008/0240230 A1* | 10/2008 | Oxman | | H04N 5/4401 375/240.01 |
| 2009/0044248 A1* | 2/2009 | Nakamura | | G06F 21/604 726/1 |
| 2009/0070596 A1* | 3/2009 | Mantin | | G06F 21/55 713/189 |
| 2010/0275037 A1* | 10/2010 | Lee | | G06F 13/385 713/189 |
| 2010/0323763 A1* | 12/2010 | Englebrecht | | H04H 20/57 455/566 |
| 2014/0013124 A1* | 1/2014 | Little | | G06F 21/72 713/189 |

OTHER PUBLICATIONS

USPTO Final Rejection for U.S. Appl. No. 12/253,207 dated Sep. 24, 2014; 10 pages.
USPTO Final Rejection for U.S. Appl. No. 12/253,207 dated Sep. 29, 2015; 16 pages.
USPTO Final Rejection for U.S. Appl. No. 12/253,207 dated Oct. 10, 2013; 18 pages.
USPTO Final Rejection for U.S. Appl. No. 12/253,207 dated Nov. 28, 2011; 13 pages.
USPTO Non Final Rejection for U.S. Appl. No. 12/253,207 dated Mar. 24, 2015; 15 pages.
USPTO Non Final Rejection for U.S. Appl. No. 12/253,207 dated Apr. 8, 2014; 9 pages.
USPTO Non Final Rejection for U.S. Appl. No. 12/253,207 dated Apr. 28, 2011; 10 pages.
USPTO Non Final Rejection for U.S. Appl. No. 12/253,207 dated Nov. 8, 2012; 13 pages.
USPTO Notice of Allowance for U.S. Appl. No. 12/253,207 dated Jan. 25, 2017; 8 pages.

* cited by examiner

SYSTEMS AND METHODS FOR DOWNLOADING CODE AND DATA INTO A SECURE NON-VOLATILE MEMORY

CROSS-REFERENCE TO RELATED APPLICATIONS

This Application is a Continuation of U.S. patent application Ser. No. 12/253,207, filed on Oct. 16, 2008, which is incorporated by reference herein in its entirety.

BACKGROUND OF THE INVENTION

Statement of the Technical Field

The invention relates to secure embedded devices comprising secure non-volatile memory features. More particularly, the invention relates to systems and methods for downloading code (e.g., a boot-loader program and an initial program loader) and/or data into one or more secure non-volatile memories during a manufacturing or personalization process.

Description of the Related Art

There are many manufacturing systems known to those having ordinary skill in the art for manufacturing conventional secure embedded devices. Such manufacturing systems generally comprise a computing device communicatively coupled to Automatic Test Equipment or smart-card pre-personalization equipment. Such conventional secure embedded devices include, but are not limited to, smart cards, personal digital assistants (PDAs), handheld communication devices, and general purpose computers. These conventional secure embedded devices typically comprise various security features, such as a secure non-volatile memory feature. The secure non-volatile memory feature is enabled by the scrambling and/or ciphering of code and/or data prior to being written to a secure non-volatile memory of a secure embedded device. This scrambling and/or ciphering process is typically performed during a device testing stage or device personalize stage of a manufacturing process.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the present invention will now be described with respect to FIGS. 1-4B. Embodiments of the present invention relate to systems implementing methods for downloading code and/or data into a secure non-volatile memory of a recently fabricated secure embedded device (SED) during a manufacturing or personalization process. The term "scramble", as used herein, refers to the transformation of code and/or data into a scrambled code and/or data that is not reversible without a scramble key. Similarly, the term "cipher", as used herein, refers to the transformation of code and/or data into a ciphered code and/or data that is not reversible without a cipher key. The terms "scramble key", as used herein, refers to a numerical value facilitating a descrambling of scrambled code and/or scrambled data. The term "cipher key", as used herein, refers to a numerical value facilitating the deciphering of ciphered code and/or ciphered data.

Notably, the system embodiments and method embodiments of the present invention allow downloading of information into a secure non-volatile memory without pre-processing of the same. The phrase "download", as used herein, refers to the transferring of code and/or data from a first device to a second device communicatively coupled to the first device. The method embodiments of the present invention also allow scramble/cipher keys to be different or unique for each of a plurality of SEDs. One can appreciate that these different/unique scramble/cipher keys provide SEDs with a relatively high level of security.

Before describing the system embodiments and method embodiments of the present invention, it will be helpful in understanding an exemplary environment in which the invention can be utilized. In this regard, it should be understood that the computing system embodiments and method embodiments of the present invention can be utilized in a variety of different applications where information is to be downloaded into a secure non-volatile memory. Such applications include, but are not limited to, general purpose computer system applications, integrated circuit card (e.g., smart-card) applications, handheld computer system (e.g., personal digital assistant) applications, communication system (e.g., mobile telephone) applications, and other embedded device applications.

Figure 1:
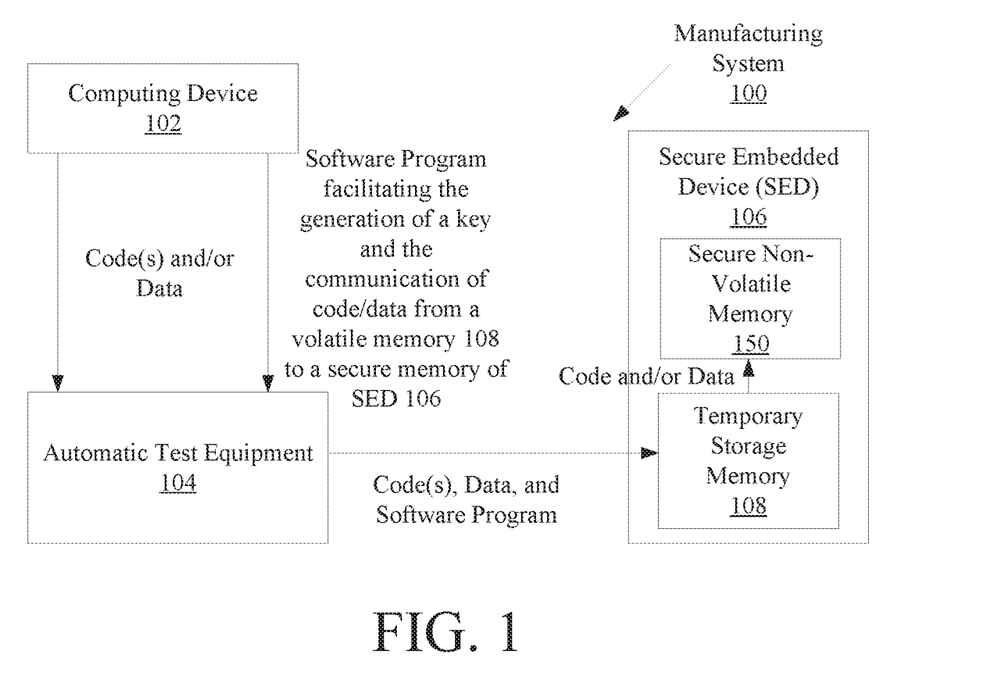
FIG. 1 is a block diagram of a manufacturing system according to an embodiment of the present invention.

Referring now to FIG. 1, there is provided a schematic illustration of an exemplary manufacturing system (MS) 100 according to an embodiment of the invention. MS 100 is generally configured for manufacturing (i.e., fabricating, testing, and personalizing) SEDs 106. More particularly, MS 100 implements an improved method for manufacturing SEDs 106 by downloading code and/or data to a secure non-volatile memory 150 thereof. This improved method will be described below in relation to FIGS. 3-4B. The code can include, but is not limited to, boot loader programs and initial program loaders (IPLs). Boot loader programs and IPLs are programs that are to be executed by a central processing unit (not shown) of an SED 106 during a booting process. Boot loader programs and IPLs specify an order in which software programs are to be loaded during the booting process. The software programs typically include device drivers, operating systems, platform device, platform services, and applications.

As shown in FIG. 1, the MS 100 comprises a computing device 102, Automatic Test Equipment (ATE) 104, and a secure embedded device (SED) 106. Embodiments of the present invention are not limited in this regard. For example, if the MS 100 is used in a smart-card application, then the MS 100 can include smart-card pre-personalization equipment (not shown) instead of or in addition to the ATE 104. Smart-card pre-personalization equipment (not shown) is well known to those having ordinary skill in the art, and therefore will not be described herein.

The computing device 102 is a desktop personal computer system, a laptop personal computer system, or any other general purpose computer processing device. The computing device 102 facilitates the control and/or monitoring of a manufacturing process by a user (e.g., a supervisor, an engineer, an operator, or a technician). The manufacturing process will be described below in relation to FIGS. 3-4B. Accordingly, the computing device 102 is communicatively coupled to the ATE 104 and/or the smart-card pre-personalization equipment (not shown). The computing device 102 is configured for communicating unscrambled, unciphered, scrambled, and/or ciphered code(s) to the ATE 104 and/or the smart-card pre-personalization equipment (not shown) prior to or during the manufacturing process. Similarly, the computing device 102 is also configured for communicating unscrambled, unciphered, scrambled, and/or ciphered data to the ATE 104 and/or smart-card pre-personalization equipment (not shown) prior to or during the manufacturing process. Each of the phrases "unscrambled code", "unciphered code", "unscrambled data", and "unciphered data", as used herein, refers to code or data that has not been processed for transforming the same into a scrambled or ciphered format.

It should be noted that the computing device 102 can process the code and/or data for purposes of transforming it into scrambled or ciphered code and/or data. The scrambling or ciphering of the code and/or data can be achieved using a scrambling and/or ciphering algorithm. Scrambling and ciphering algorithms are well known to those having ordinary skill in the art, and therefore will not be described herein. However, it should be understood that any scrambling and/or ciphering algorithm can be used without limitation. This code/data processing can be performed for ensuring that the code and/or data is stored in the computing device 102 in a secure format so as to be protected from an attacker. This code/data processing can also be performed for ensuring that the code and/or data is communicated to the ATE 104 and/or smart-card pre-personalization equipment (not shown) in a secure format. The computing device 102 can also generate and retain a scramble or cipher key suitable for a subsequent descrambling or deciphering of the scrambled or ciphered code/data by the ATE 102, the smart-card pre-personalization equipment (not shown), or the SED 106.

It should also be noted that the computing device 102 can append a signature or checksum to the code and/or data for subsequent use in determining if the code and/or data is corrupted. Signatures and checksums are well known to those having ordinary skill in the art, and therefore will not be described herein. Any known signature and checksum can be used without limitation.

Referring again to FIG. 1, the computing device 102 is further configured for communicating a software program to the ATE 104 and/or smart-card pre-personalization equipment (not shown) prior to or during the manufacturing process. The software program facilitates the generation of a scramble or cipher key at the SED 106. It should be understood that the scramble or cipher key is generated at the SED 106 when the SED 106 comprises a random or pseudo-random number generator (not shown). If the SED 106 does not comprise a random or pseudo-random number generator (not shown), then the value of the scramble or cipher key is generated at the ATE 104 or the smart-card pre-personalization equipment (not shown). The software program also facilitates the initialization of the scramble or cipher key at the SED 106. This initialization generally involves setting a value of the scramble or cipher key equal to a random number generated by a random or pseudo-random number generator (not shown) of the SED 106, the ATE 104, or the smart-card pre-personalization equipment (not shown). The software program further facilitates the transfer of code/data from a temporary storage memory 108 of the SED 106 to a secure non-volatile memory 150 of the SED 106. Notably, if scrambled or ciphered code/data is stored in the temporary storage memory 108, then the code/data is descrambled or deciphered prior to being communicated to the secure non-volatile memory 150 of the SED 106 using a scramble or cipher key provided by the ATE 104 and/or the smart-card pre-personalization equipment (not shown).

The ATE 104 is an automated device that is used to quickly test the fabricated SED 106 during the manufacturing process. The ATE 104 is controlled by the computing device 102. The ATE 104 can include, but is not limited to, various test equipment whose operating modes and measurements are controlled and analyzed by the computing device 102. Such test equipment can include, but is not limited to, voltmeters, ohm meters, ammeters, multi-meters, oscilloscopes, power supplies, and signal generators.

As shown in FIG. 1, the ATE 104 is communicatively coupled to the computing device 102 and the SED 106. The ATE 104 is configured for obtaining various measurement values during the manufacturing process. The ATE 104 is also configured for communicating the obtained measurement values to the computing device 102. The ATE 104 is further configured for receiving unscrambled codes/data, unciphered codes/data, scrambled codes/data, ciphered codes/data, and software program(s) from the computing device 102. The ATE 104 is also configured for storing the received code, data, and software program(s) therein. The ATE 104 is further configured for communicating the received code, data, and software program(s) to the SED 106.

It should be noted that the ATE 104 can process received unscrambled or unciphered code/data for purposes of transforming it into scrambled or ciphered code/data. The scrambling or ciphering of the code and/or data can be achieved using a scrambling or ciphering algorithm. It should be understood that any known scrambling or ciphering algorithm can be used without limitation. This code/data processing can be performed for ensuring that the code/data is stored in the ATE 104 in a secure format so as to be protected from an attacker. This code/data processing can also be performed for ensuring that the code/data is communicated to the SED 106 in a secure format. The ATE 104 can also generate and retain a scramble or cipher key suitable for a subsequent descrambling or deciphering the scrambled or ciphered code/data by the ATE 102, the smart-card pre-personalization equipment (not shown), or the SED 106.

It should also be noted that the ATE 104 can append a signature or checksum to the code/data for subsequent use in determining if the code/data is corrupted. Signatures and checksums are well known to those having ordinary skill in the art, and therefore will not be described herein. Any known signature and checksum can be used without limitation.

Referring again to FIG. 1, the SED 106 can include, but is not limited to, a smart card, a personal digital assistant (PDA), a handheld communication device, and a general purpose computer. SED 106 comprises various security features, such as a secure non-volatile memory feature. The secure non-volatile memory feature is enabled by the scrambling and/or ciphering of code or data prior to being written to a non-volatile memory (not shown) of the secure non-volatile memory 150. This code/data scrambling/ciphering is performed at the secure non-volatile memory 150 during the manufacturing process using a particular scrambling or ciphering algorithm. This scrambling or ciphering algorithm is different from the scrambling or ciphering algorithm employed by the computing device 102, ATE 104, and/or the smart-card pre-personalization equipment (not shown).

Figure 2:
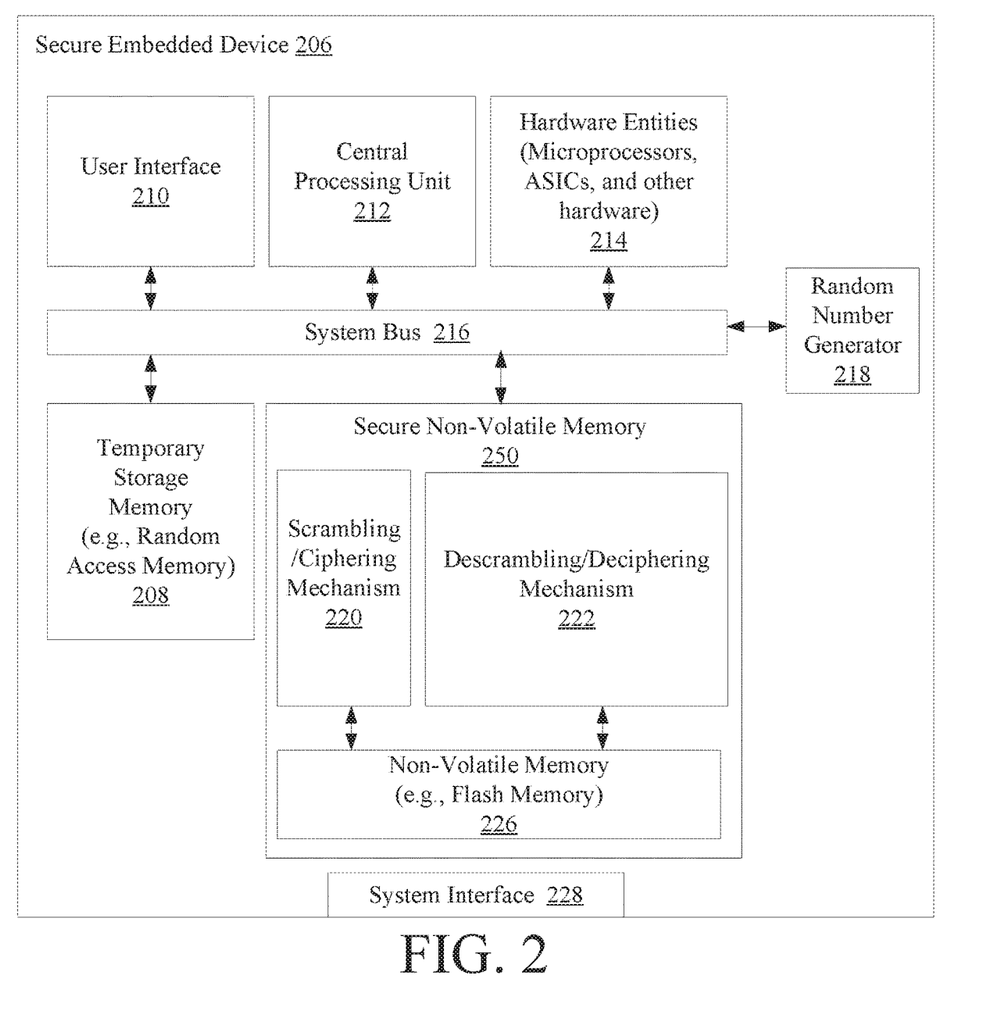
FIG. 2 is a detailed block diagram of the secure embedded device according to an embodiment of the present invention.

A detailed block diagram of an exemplary SED 206 is provided in FIG. 2. The SED 206 is an exemplary embodiment of the SED 106 of FIG. 1. Embodiments of the present invention are not limited to the SED architecture shown in FIG. 2. As shown in FIG. 2, the SED 206 comprises a system interface 228, a user interface 210, a central processing unit (CPU) 212, a system bus 216, a temporary storage memory 208 connected to and accessible by other portions of the SED 206 through system bus 216, and hardware entities 214 connected to the system bus 216. The CPU 212 is configured for starting and executing the code(s) and software program(s) received at the SED 206 from an ATE (e.g., the ATE 104 of FIG. 1) and/or smart-card pre-personalization equipment (not shown).

User interface 210 can comprise input devices, output devices, and software routines configured to allow a user to interact with and control software applications installed on the SED 206. Such input and output devices include, but are not limited to, a display screen (not shown), a speaker (not shown), a keypad (not shown), a directional pad (not shown), a directional knob (not shown), and a microphone (not shown).

The hardware entities 214 may include microprocessors, application specific integrated circuits (ASICs), and other hardware. At least some of the hardware entities 214 perform actions involving access to and use of the temporary storage memory 208. The temporary storage memory 208 is computer memory that loses stored information when not powered. The temporary storage memory 208 can be, but is not limited to, any type of Random Access Memory (RAM), Static Random Access Memory (SRAM), Dynamic Random Access Memory (DRAM), flash memory, Electrically Erasable Programmable Read-Only Memory (EEPROM), disk driver, and compact disc read only memory (CD-ROM).

The system interface 228 allows the SED 206 to communicate directly or indirectly with an ATE (e.g., the ATE 104 described above in relation to FIG. 1) and/or smart-card pre-personalization equipment (not shown). If the SED 206 is communicating indirectly with the ATE (e.g., the ATE 104 described above in relation to FIG. 1) and/or smart-card pre-personalization equipment (not shown), then the SED 206 is sending and receiving communications through a network (not shown). The network can be a local area network, a wide area network, or a personal area network.

The SED 206 also comprises a random or pseudo-random number generator (RNG) 218. Embodiments of the present invention are not limited in this regard. For example, the SED 206 can be absent of the RNG 218. Random and pseudo random number generators are well known to persons having ordinary skill in the art, and therefore will not be described herein. However, it should be understood that any known random or pseudo-random number generator can be used without limitation. It should also be understood that the RNG 218 is configured to generate a random number sequence including a plurality of random or pseudo random numbers. One or more of the random or pseudo random numbers can define a scramble or cipher key.

The SED 206 further comprises a secure non-volatile memory 250 connected to and accessible by other portions of the SED 206 through the system bus 216. The secure non-volatile memory 250 provides a means for preventing access to code and/or data stored therein by an attacker. As shown in FIG. 2, the secure non-volatile memory 250 comprises a scrambling/ciphering mechanism (SCM) 220, a descrambling/deciphering mechanism (DDM) 222, and a non-volatile memory 226. The non-volatile memory 226 is computer memory that can retain stored information even when not powered. The non-volatile memory 226 can include, but is not limited to, flash memory.

The SCM 220 is configured for transforming code into scrambled or ciphered code in accordance with a particular scrambling or ciphering algorithm. The SCM 220 is also configured for transforming data into scrambled or ciphered data in accordance with a particular scrambling or ciphering algorithm. The scrambling or ciphering algorithm can be different from the scrambling or ciphering algorithm employed by a computing device (e.g., the computing device 102 described above in relation to FIG. 1), an ATE (e.g., the ATE 104 described above in relation to FIG. 1), and/or a smart-card pre-personalization equipment (not shown). For example, if the first set of binary values of a code are 0x12345678, then the SCM 220 transforms the binary values 0x12345678 to the scrambled or ciphered values 0xDC056199. Embodiments of the present invention are not limited in this regard.

The SCM 220 is further configured for writing the scrambled or ciphered code/data to the non-volatile memory 226 for storage of the same. It should be understood that the scrambled or ciphered code/data can be written to the non-volatile memory 226 in consecutive memory locations or address-scrambled memory locations. For example, if the code/data is written to address-scrambled memory locations, then the SCM 220 writes a first set of scrambled or ciphered values (e.g., 0xDC056199) to a first memory location of the non-volatile memory 226, wherein the first memory location is defined by the scramble/cipher key (e.g., at address 0xAA002804). Thereafter, the SCM 220 writes a second set of scrambled or ciphered values (e.g., 0x0B823174) to a second memory location of the non-volatile memory 226 that is defined by the same scramble/cipher key (e.g., at address 0x01C818D0), and so on. Embodiments of the present invention are not limited in this regard.

The DDM 222 is provided for obtaining original code from scrambled or ciphered code prior to execution of the same by one or more components (e.g., the CPU 212) of SED 206. The DDM 222 is also provided for obtaining original data from scrambled or ciphered data prior to the use of the same by one or more components (e.g., the CPU 212) of SED 206. The DDM 222 uses at least one scramble or cipher key (a) to determine the address scrambled memory locations in which code/data was written to in the non-volatile memory 226, (b) to descramble or decipher the scrambled/ciphered code, and/or (c) to descramble or decipher the scrambled/ciphered data.

The DDM 222 is configured for retrieving scrambled or ciphered code/data from the non-volatile memory 226. The DDM 222 is also configured for processing the retrieved scrambled or ciphered code/data to obtain the original code/data therefrom. This processing involves descrambling or deciphering the retrieved code/data using one or more scramble or cipher keys. The DDM 222 is further configured for communicating the descrambled or deciphered code to the CPU 212 for execution of the same.

The following example (1) is provided to assist a reader in understanding the scrambling/ciphering and descrambling/deciphering features of the SED 206.

Example 1

Eight (8) sectors of code are to be written to the secure non-volatile memory 226. Each of the eight (8) sectors comprises four thousand ninety-six (4096) bytes of information. The eight (8) sectors are written to the secure non-volatile memory 226 in address-scrambled memory locations as shown in Table 1.

TABLE 1

| Address | Sector |
|---------|--------|
| 0 | 4 |
| 1 | 3 |
| 2 | 0 |
| 3 | 7 |
| 4 | 6 |
| 5 | 1 |
| 6 | 2 |
| 7 | 5 |

It should be noted that the eight (8) sectors are processed prior to being written to the non-volatile memory 226. This processing is performed for transforming the four thousand ninety-six (4096) bytes of information of each sector into scrambled or ciphered information. For example, if a first sector "0" comprises the physical content 01 02 03 04 05 06 07 08 09 0A 0B 0C 0D 0E 0F 10, then the scrambled or ciphered information comprises the physical content 8D 00 93 14 8A 89 D3 83 30 EA 3F C8 98 04 8E FE.

If the CPU 212 requests information stored at address "0" of the non-volatile memory 226, then the DDM 222 can translate address "0" to address "2". The DDM 222 also reads the scrambled or ciphered information from address "2" and transforms the scrambled or ciphered information from the physical content 8D 00 93 14 8A 89 D3 83 30 EA 3F C8 98 04 8E FE to the descrambled or deciphered physical content 01 02 03 04 05 06 07 08 09 0A 0B 0C 0D 0E 0F 10.

Figure 3:
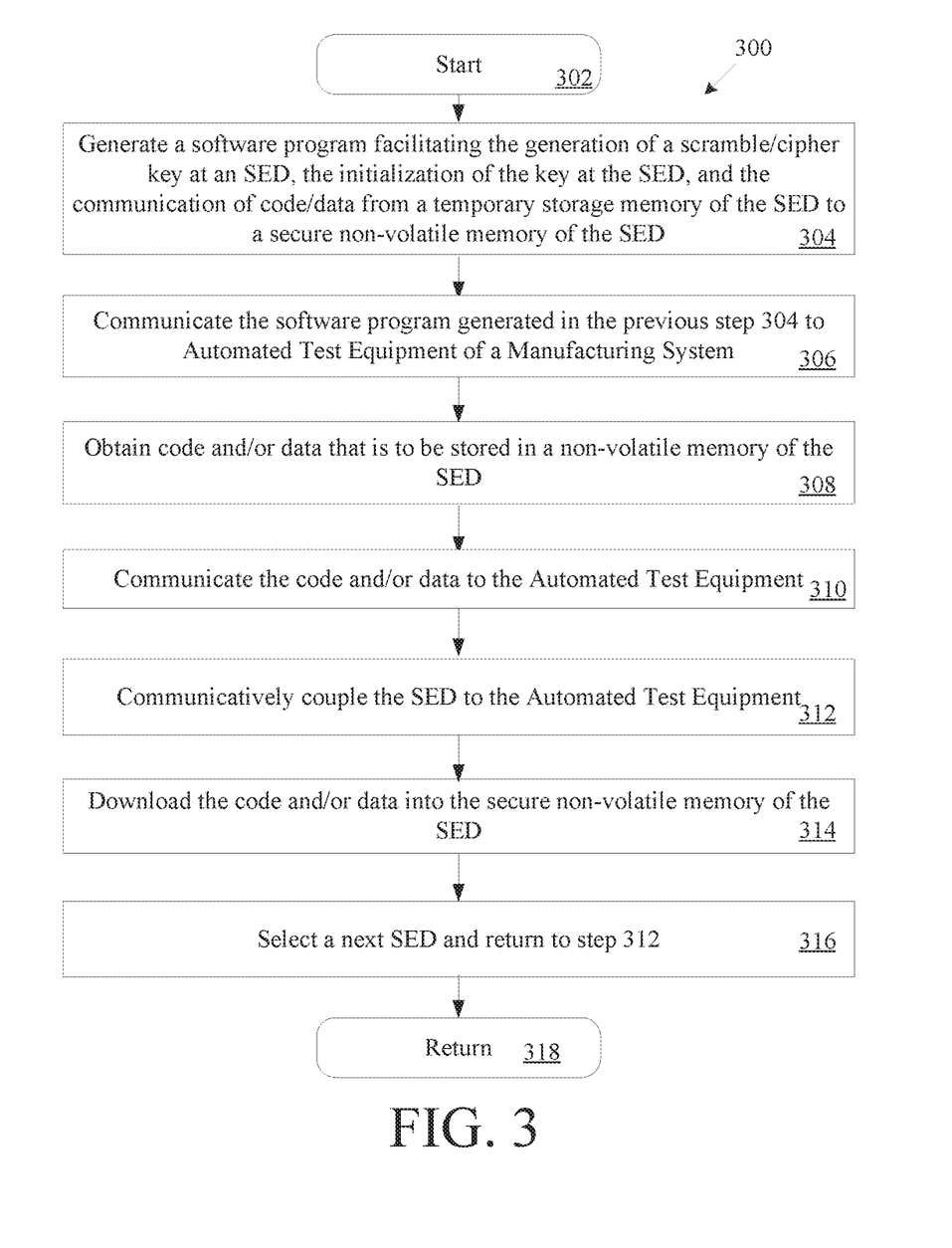
FIG. 3 is a flow diagram of a method for manufacturing a plurality of secure embedded devices according to an embodiment of the present invention.

Referring now to FIG. 3, there is provided a flow diagram of a method 300 for manufacturing a plurality of SEDs 106, 206 (described above in relation to FIG. 1 and FIG. 2) according to an embodiment of the present invention. As shown in FIG. 3, the method 300 starts at step 302 and continues to step 304. In step 304, a software program is generated. The software program can be generated by a user (e.g., a supervisor, an engineer, an operator, or a technician) of a computing device 102 (described above in relation to FIG. 1) of a manufacturing system 100 (described above in relation to FIG. 1). The software program facilitates the generation of a scramble or cipher key at the SED 106, 206. The software program also facilitates the initialization of the scramble or cipher key at the SED 106, 206. The software program further facilitates the transfer of code/data from a temporary storage memory 108, 208 (described above in relation to FIG. 1 and FIG. 2) of the SED 106, 206 to a secure non-volatile memory 150, 250 (described above in relation to FIG. 1 and FIG. 2) of the SED 106, 206.

Upon completing step 304, the method 300 continues with step 306. In step 306, the software program is communicated from the computing device 102 to the ATE 104 (described above in relation to FIG. 1) and/or smart-card pre-personalization equipment (not shown). Thereafter, step 308 is performed where code and/or data is obtained. The code can include, but is not limited to, boot loader programs and IPLs. The data can include, but is not limited to, information useful for user authentication purposes. Such information can include user identifications (IDs) and passwords. In step 310, the code and/or data is communicated from the computing device 102 to the ATE 104 and/or smart-card pre-personalization equipment (not shown).

It should be noted that the code and/or data can be transformed into scrambled or ciphered code/data prior to being communicated to the ATE 104 and/or smart-card pre-personalization equipment (not shown). This scrambling or ciphering can be achieved using a particular scrambling or ciphering algorithm that is different from the scrambling or ciphering algorithm employed by the secure non-volatile memory 150, 250 (described above in relation to FIG. 1 and FIG. 2). In such a scenario, the computing device 102 can generate a scramble or cipher key suitable for descrambling or deciphering the scrambled or ciphered code/data. The computing device 102 can also communicate the scramble or cipher key to the ATE 104 and/or smart-card pre-personalization equipment (not shown).

It should also be noted that a signature or checksum can be appended to the code and/or data prior to being communicated to the ATE 104 and/or smart-card pre-personalization equipment (not shown).

Subsequent to communicating the code/data to the ATE 104 and/or smart-card pre-personalization equipment (not shown), step 312 is performed. In step 312, the SED 106, 206 is communicatively coupled to the ATE 104 and/or smart-card pre-personalization equipment (not shown). As should be understood, step 312 can generally involve inserting the SED 106, 206 into a test fixture (not shown) electronically coupled to the ATE 104 and/or smart-card pre-personalization equipment (not shown). Test fixtures (not shown) are well known to those having ordinary skill in the art, and therefore will not be described herein. However, it should be understood that any test fixture can be used without limitation provided that it is suitable for a particular manufacturing system application.

After step 312, the method 300 continues with steps 314, 316, and 318. Step 314 generally involves downloading code and/or data into a secure non-volatile memory of a secure embedded device. An exemplary method for downloading code and/or data into a secure non-volatile memory will be described below in relation to FIGS. 4A-4B. Step 316 involves selecting a next SED and returning to step 312. In step 318, the method 300 returns to step 302 and/or other processing is resumed.

Figure 4A:
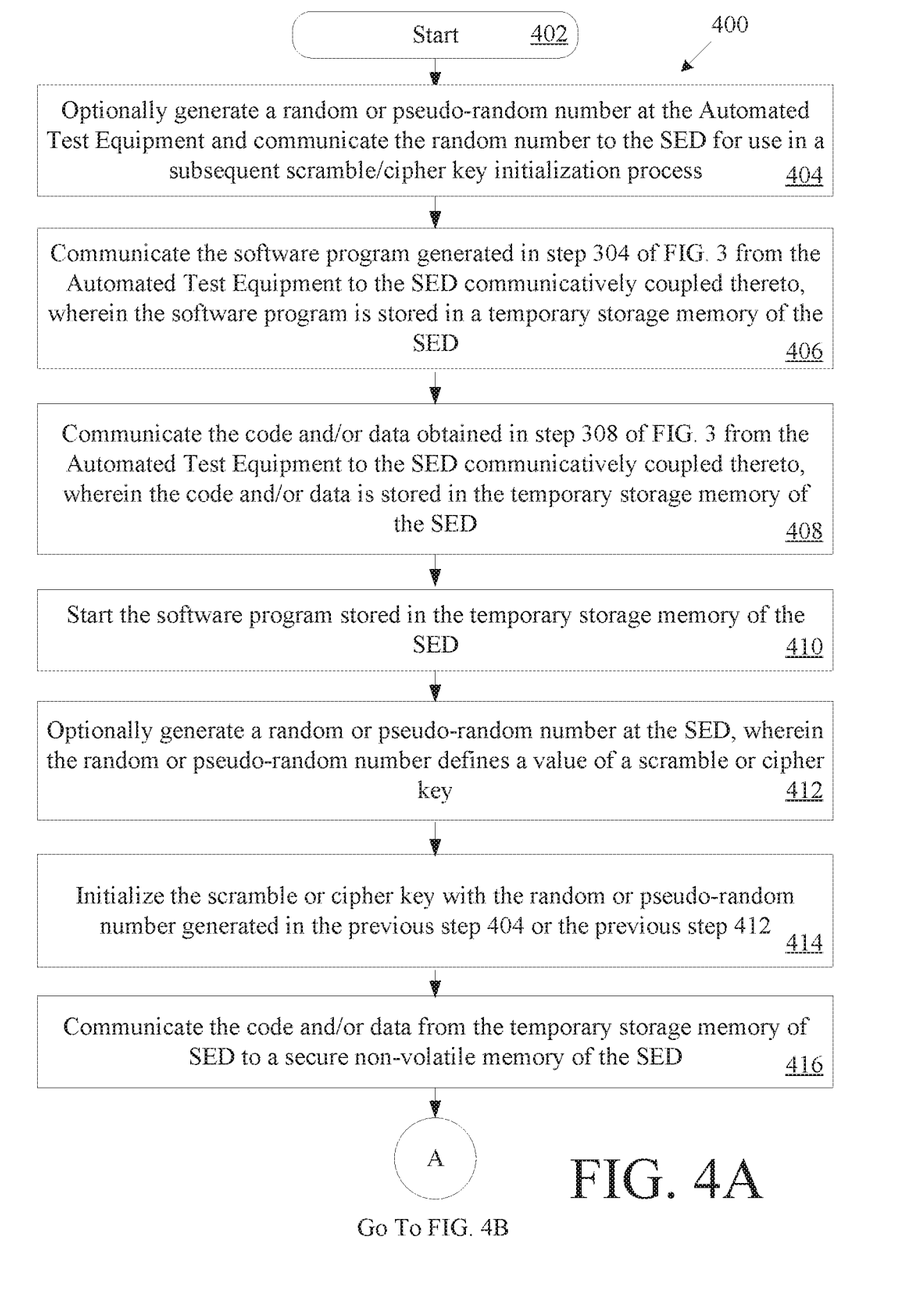
FIGS. 4A-4B collectively provide a flow diagram of the method for downloading code and/or data to a secure non-volatile memory of a secure embedded device according to an embodiment of the present invention.
Figure 4B:
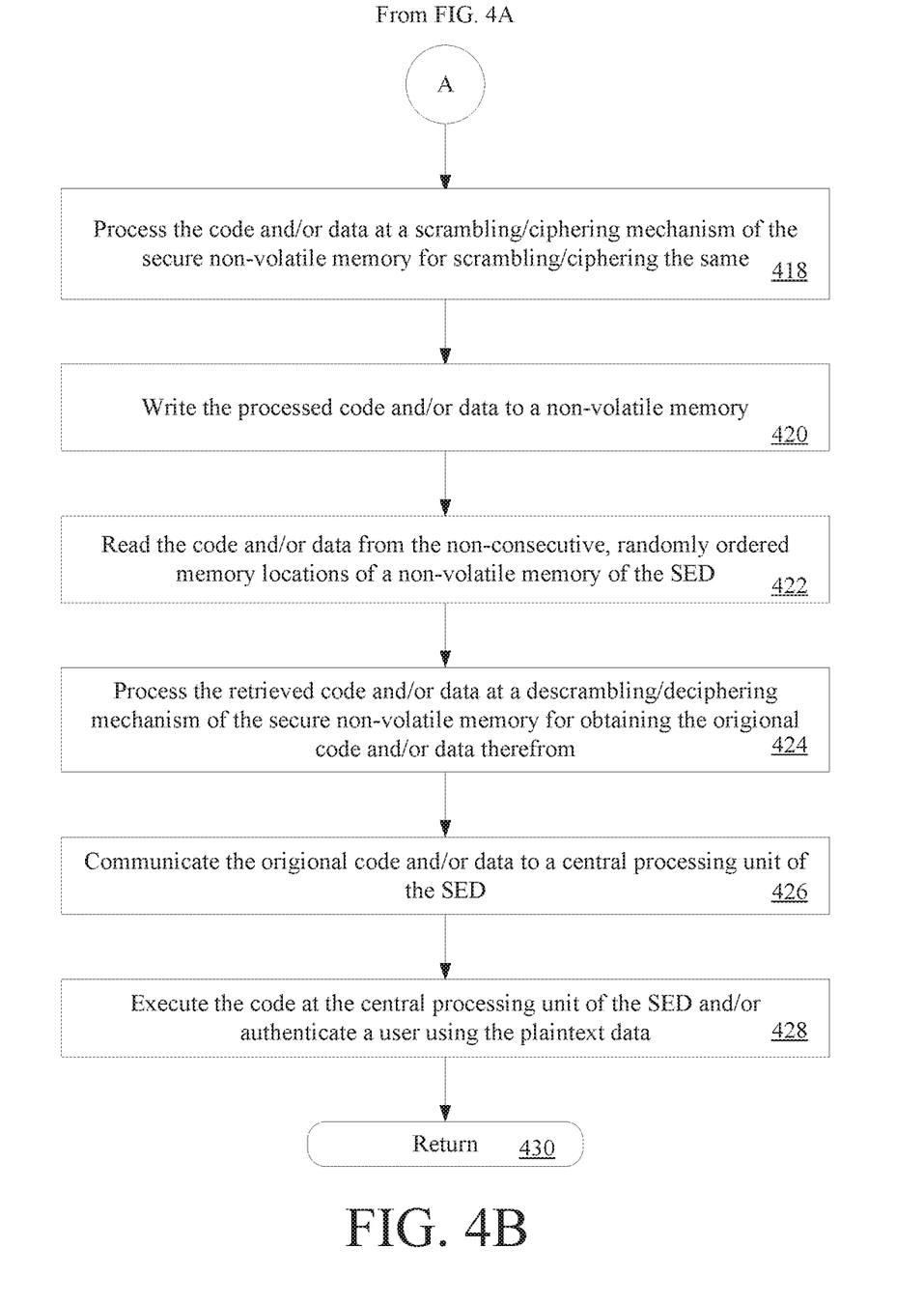

Referring now to FIGS. 4A-4B, there is provided a flow diagram of a method 400 for downloading code and/or data into a secure non-volatile memory of a secure embedded device. Method 400 can be performed in step 314 of FIG. 3. As shown in FIG. 4A, the method 400 starts at step 402 and continues to an optional step 404. In optional step 404, a random or pseudo random number is generated at the ATE 104 (described above in relation to FIG. 1) and/or smart-card pre-personalization equipment (not shown). Optional step 404 also involves communicating the random number or pseudo-random number to the SED 106, 206 (described above in relation to FIG. 1 and FIG. 2) for use in a subsequent scramble or cipher key initialization process. It should be noted that the scramble or cipher key initialization process is performed for initializing a scramble or cipher key suitable for descrambling or deciphering code/data in accordance with the scrambling or ciphering algorithm employed by the secure non-volatile memory 150, 250 (described above in relation to FIG. 1 and FIG. 2). It should also be noted that step 404 is performed when the SED 106, 206 does not comprise a random or pseudo-random number generator 218 (described above in relation to FIG. 2).

After completing optional step 404, the method 400 continues with step 406. In step 406, the software program generated in step 304 of FIG. 3 is communicated from the ATE 104 and/or smart-card pre-personalization equipment (not shown) to the SED 106, 206 communicatively coupled thereto. Step 406 also involves storing the software program in a temporary storage memory 108, 208 (described above in relation to FIG. 1 and FIG. 2) of the SED 106, 208. In a next step 408, the code and/or data obtained in step 308 of FIG. 3 is communicated from the ATE 104 and/or smart-card pre-personalization equipment (not shown) to the SED 106, 206. Step 408 also involves storing the code and/or data in the temporary storage memory 108, 208 of the SED 106, 206. The code can include, but is not limited to, boot loader programs and IPLs. The data can include, but is not limited to, information useful for user authentication purposes. Such information can include user identifications (IDs) and passwords.

Subsequent to the completion of step 408, the method 400 continues with step 410. In step 410, the software program is started. In response to starting the software program, the following optional step 412 is performed. Optional step 412 involves generating a random or pseudo-random number at the SED 106, 206. The random or pseudo-random number can define a value of a scramble or cipher key suitable for descrambling or deciphering code/data in accordance with the scrambling or ciphering algorithm employed by the secure non-volatile memory 150, 250 (described above in relation to FIG. 1 and FIG. 2) of the SED 106, 206. Thereafter, step 414 is performed where a scramble or cipher key is initialized with the random or pseudo-random number. This initialization can involve communicating the random or pseudo-random number to a secure non-volatile memory 150, 250 (described above in relation to FIG. 1 and FIG. 2) and setting the value of the scramble or cipher key equal to the value of the random or pseudo-random number.

After initializing the scramble or cipher key, step 416 is performed where the code and/or data is communicated from the temporary storage memory 108, 208 of the SED 106, 206 to the secure non-volatile memory 150, 250 for storage therein. It should be understood that step 416 can involve processing the code and/or data prior to communicating the same to the secure non-volatile memory 150, 250. This processing can be performed to descramble or decipher the code/data, wherein the code/data is scrambled or ciphered in accordance with a scrambling or ciphering algorithm employed by a computing device (e.g., the computing device 102 described above in relation to FIG. 1), an ATE (e.g., the ATE 104 described above in relation to FIG. 1), or the smart-card pre-personalization equipment (not shown). This processing can also be performed for determining if the code/data is corrupted by authenticating a signature or checksum appended thereto.

Upon completing step 416, the method 400 continues with step 418 of FIG. 4B. In step 418, the code and/or data is processed by a SCM 220 (described above in relation to FIG. 2) of the secure non-volatile memory 150, 250. This processing is performed for scrambling or ciphering the code/data, i.e., transforming the code/data to scrambled or ciphered code/data in accordance with a particular scrambling or ciphering algorithm that is different from the algorithm employed by the computing device (e.g., the computing device 102 of FIG. 1), the ATE (e.g., the ATE 104 of FIG. 1), or the smart-card pre-personalization equipment (not shown). Thereafter, step 420 is performed where the scrambled or ciphered code/data is written to the non-volatile memory (e.g., memory 226 described above in relation to FIG. 2). As noted above, the scrambled or ciphered code/data can be written to consecutive or address-scrambled memory locations of the non-volatile memory (e.g., memory 226 of FIG. 2).

After step 420, the method 400 can continue with steps 422-428. Embodiments of the present invention are not limited in this regard. The method 400 can be absent of steps 422-428. It should be understood that steps 422-428 can be performed for testing the operations of a CPU (e.g., the CPU 212 of FIG. 2) of the SED 106, 206. Steps 422-428 can also be performed for determining if the code and/or data was successfully downloaded to the secure non-volatile memory 150, 250. Steps 422-428 can further be performed for determining if the scramble or cipher key was properly initialized in step 414 of FIG. 4A.

As shown in FIG. 4B, step 422 involves reading all or a portion of the scrambled or ciphered code/data from the secure non-volatile memory 150, 250 of the SED 106, 206. Step 422 can involve receiving at the secure non-volatile memory 150, 250 a query for a sector code and/or data (e.g., sector "0") stored in a particular memory address (e.g., address "0") of the non-volatile memory (e.g., memory 226 of FIG. 2) from the CPU (e.g., CPU 212 of FIG. 2). Step 422 can also involve translating the particular memory address (e.g., address "0") to a scrambled or ciphered memory address (e.g., address "2"). Step 422 can further involve retrieving the sector of scrambled or ciphered code/data (e.g., sector "0") stored in the non-volatile memory (e.g., memory 216 of FIG. 2) at the particular memory address (e.g., address "0") or the scrambled/ciphered memory address (e.g., address "2").

Step 424 involves processing the retrieved scrambled or ciphered code/data at a DDM (e.g., DDM 222 described above in relation to FIG. 2) of the secure non-volatile memory 150, 250. This processing is performed to transform the scrambled or ciphered information into descrambled or deciphered information. The information is descrambled or deciphered using the scramble or cipher key initialized in the previous step 414 of FIG. 4A.

Step 426 involves communicating the descrambled or deciphered code/data to the CPU (e.g., CPU 204 of FIG. 2). At the CPU, step 428 is performed where the descrambled or deciphered code is executed. It should be noted that step 428 can alternatively or additionally involve using the descrambled or deciphered data to authenticate a user of the SED 106, 206. Upon completing step 428, step 430 is performed where the method 400 returns to step 402 and/or other processing is resumed.

In light of the forgoing description of the invention, it should be recognized that the system embodiments and method embodiments of the present invention allow downloading of information into a secure non-volatile memory without pre-processing of the same. The system embodiments and method embodiments of the present invention also allow scramble or cipher keys to be different or unique for each of a plurality of SEDs. One can appreciate that these different/unique scramble or cipher keys provide SEDs with a relatively high level of security. The system embodiments and method embodiments of the present invention also facilitate the loading of code/data into the non-volatile memory 216 at a customer's or subcontractor's premise without compromising the scrambling or ciphering algorithms.

It should also be recognized that embodiments of the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Embodiments of the present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A secure embedded device, comprising:
   a secure non-volatile memory comprising a scrambling/ciphering mechanism;
   a temporary memory coupled to the secure non-volatile memory, the temporary memory to store a software program and information received from an external device; and
   a processor coupled to the secure non-volatile memory and the temporary memory, the processor configured to execute the software program to:
      generate a scramble/cipher key; and
      transfer the information from the temporary memory to the secure non-volatile memory,
   wherein the secure non-volatile memory is to:
      use the scrambling/ciphering mechanism and a scramble algorithm or a cipher algorithm to scramble or cipher the information transferred from the temporary memory into transformed information;
      determine a scrambled or ciphered memory location of the secure non-volatile memory for a portion of the transformed information by applying the scramble or cipher key to a memory address of the secure non-volatile memory; and
      write the portion of the transformed information to the scrambled or ciphered memory location of the secure non-volatile memory.

2. The secure embedded device of claim 1, wherein the non-volatile secure memory is further to write a second portion of the transformed information to a second memory location determined based on the scramble or cipher key.

3. The secure embedded device of claim 1, wherein the non-volatile secure memory comprises a number generator configured to generate a random or pseudo-random number, wherein the scramble/cipher key is based on the random or pseudo random number.

4. The secure embedded device of claim 1, wherein the information received form the external device comprises at least one of boot code and authentication information.

5. A system comprising:
   a first device configured to provide information and a software program; and
   a secure embedded device comprising a system interface to receive the information and the software program from the first device, the secure embedded device comprising a secure non-volatile memory, a temporary memory to store the information and the software program, and a processor coupled to the secure non-volatile memory and the temporary memory, the processor configured to execute the software program to:
      generate a scramble/cipher key and initialize the scramble/cipher key; and
      provide the information from the temporary memory to the secure non-volatile memory,
   wherein the secure non-volatile memory is to:
      use a scrambling/ciphering mechanism of the secure non-volatile memory to scramble or cipher the information transferred from the temporary memory into transformed information;
      determine a scrambled or ciphered memory location for a portion of the transformed information by applying the scramble or cipher key to a memory address of the secure non-volatile memory; and
      write the portion of the transformed information to the scrambled or ciphered memory location.

6. The system of claim 5, wherein the secure non-volatile memory is further to write a second portion of the transformed information to a second memory location determined based on the scramble or cipher key.

7. The system of claim 5, wherein the secure embedded device further comprises a number generator configured to generate a random or pseudo-random number, wherein the initialization of the scramble or cipher key is based on the generated random or pseudo-random number.

8. The system of claim 5, wherein the information received from the first device comprises at least one of boot code and authentication information.

9. The system of claim 5, wherein the processor is configured to determine that the information has not been corrupted by authenticating a signature or checksum associated with the information.

10. The system of claim 5, wherein the secure non-volatile memory is configured to descramble or decipher the transformed information, using the scramble or cipher key, to generate the information.

* * * * *